March 4, 1930.    A. ZAPART    1,749,459
DIRECTION INDICATOR FOR AUTOMOBILES
Filed Sept. 15, 1928    3 Sheets-Sheet 1
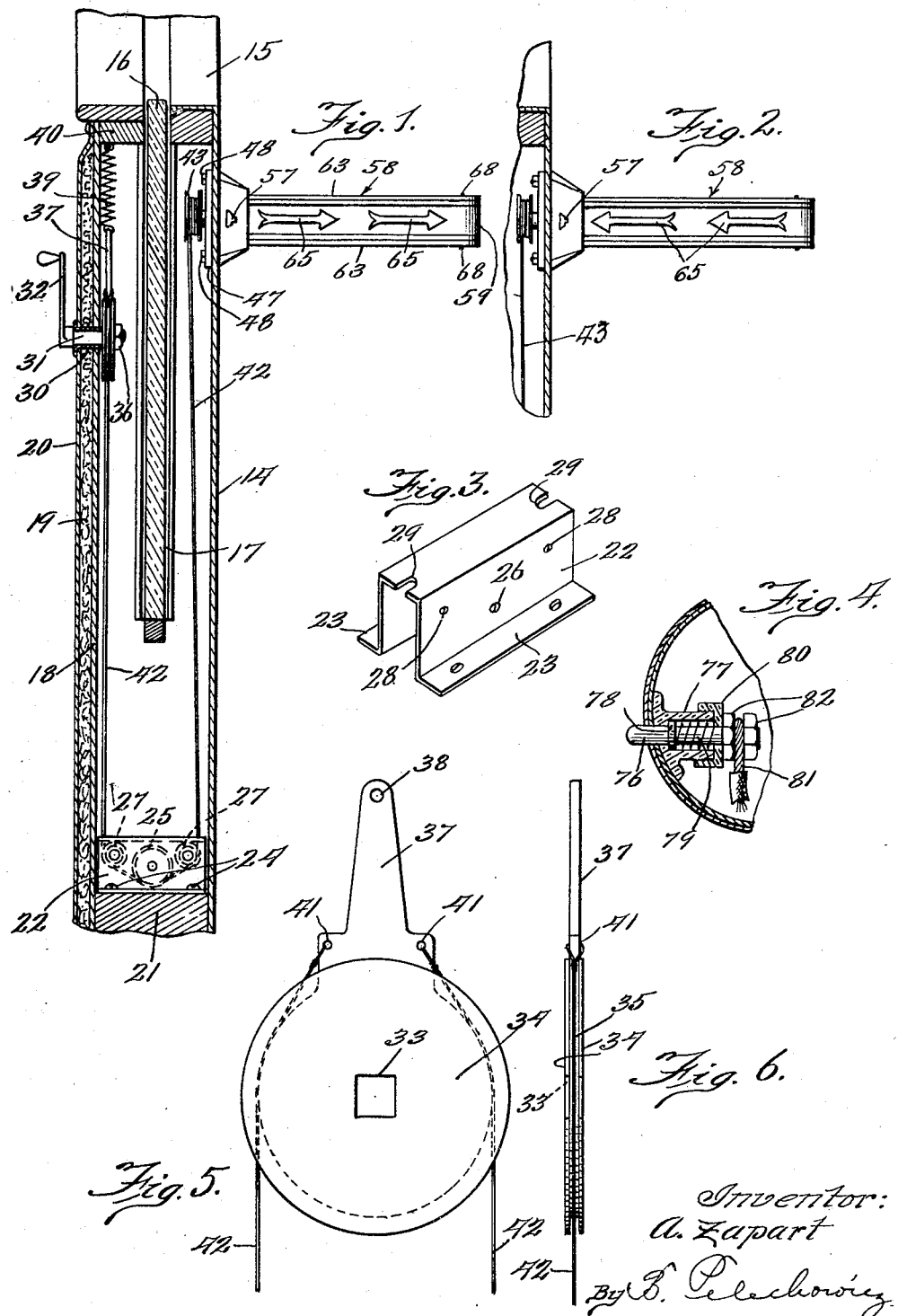

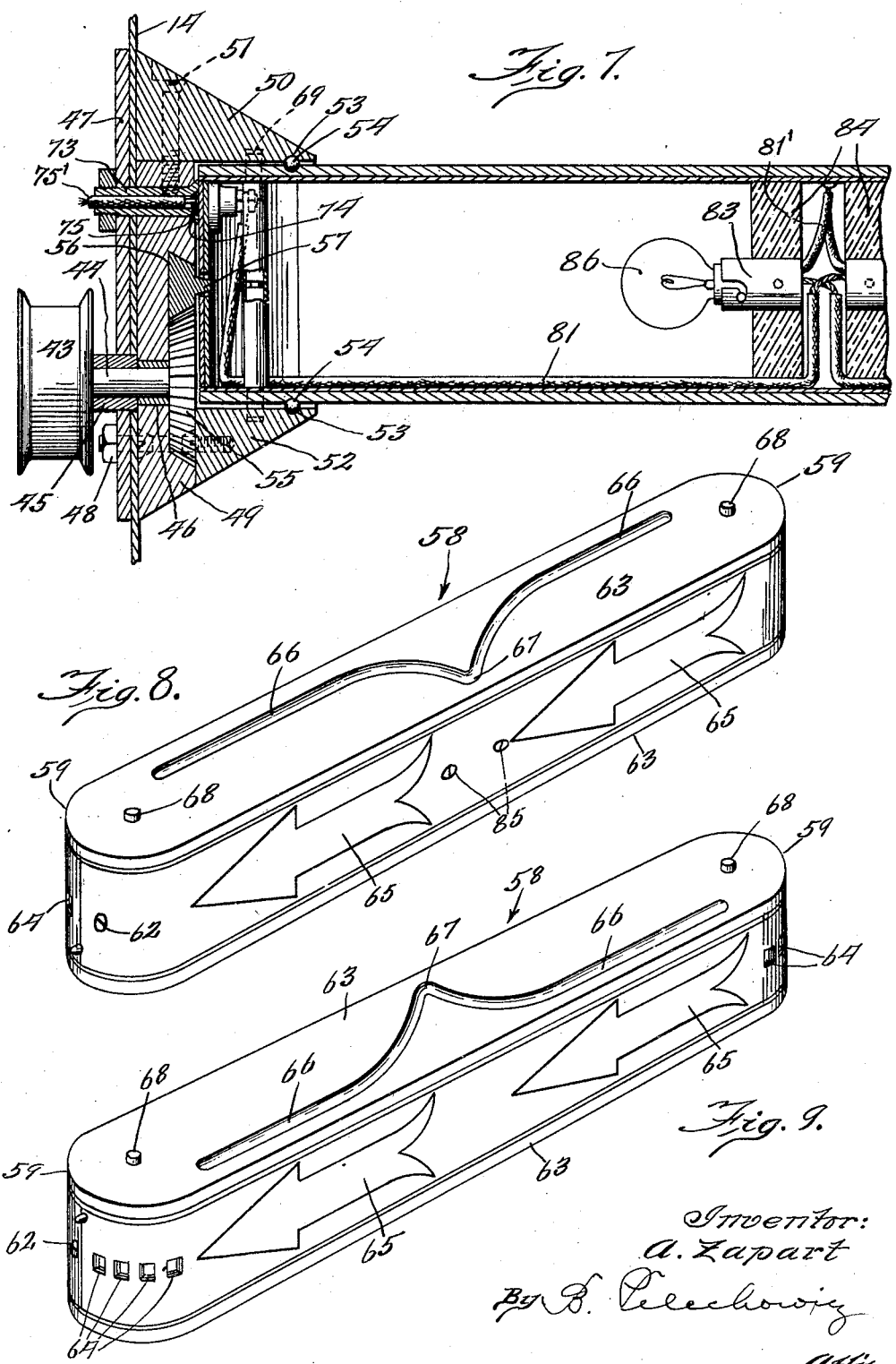

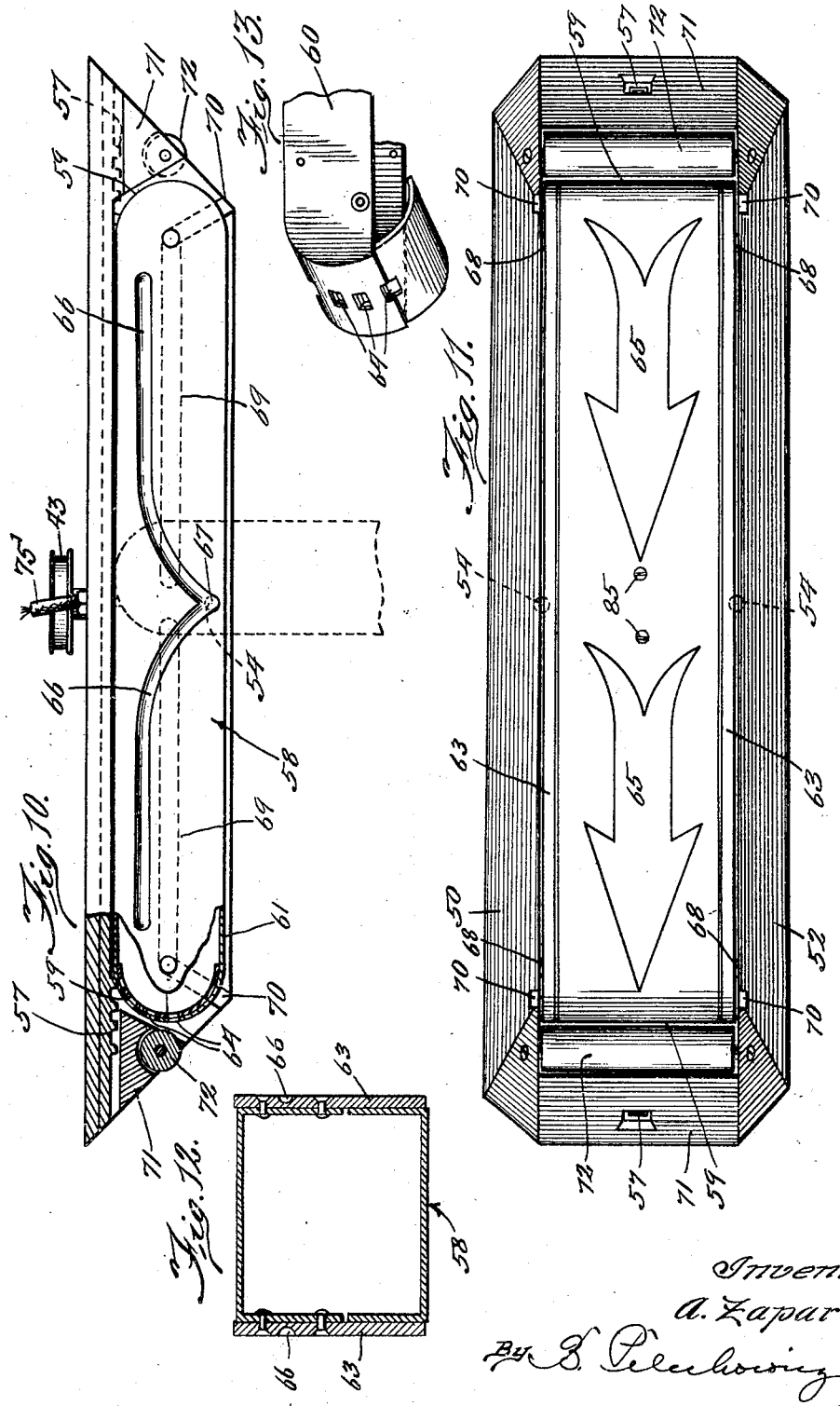

Patented Mar. 4, 1930

1,749,459

UNITED STATES PATENT OFFICE

ANDREW ZAPART, OF BROOKLYN, NEW YORK

DIRECTION INDICATOR FOR AUTOMOBILES

Application filed September 15, 1928. Serial No. 306,103.

My invention relates to direction indicators for automobiles adapted to be operated by the driver of a car so as to indicate to other drivers or chauffeurs the direction in which the automobile to which this device is attached, is to travel or turn.

The primary object of the invention is to guide a direction indicator which may be readily applied to the door of a car or at any other convenient point and which may be easily operated from the inside of the door adjacent the driver's seat, in the same manner as the operation of raising and lowering a window, by means of a crank so as to project an indicating device from the body of the car in an outward direction whereby arrows thereon will be presented to view to the drivers of other cars and pedestrians so that traffic may be warned of the direction of travel, and an orderly regulation of traffic will thereby be made possible.

Another object of the invention is to provide an indicator of the class described, in which an illuminated casing is mounted on the outside of the door or car body in a novel manner and equipped with means whereby it may be shifted in opposite directions so that either end may be extended outwardly, whereby arrows facing in opposite directions upon the sides thereof and illuminated from within the casing, will be presented to view pointing in the direction according to the direction of travel or turn to be made, and which when disposed in inoperative position, will lie cross-wise to the car body comparatively obscured from view.

Other objects and advantages will be apparent as the description proceeds.

In the accompanying drawings:

Fig. 1 is a vertical sectional view showing portion of a side or door of an automobile with my improved direction indicator applied thereto and projecting outwardly to indicate by the arrows travel in one direction;

Fig. 2 is a fragmentary view similar to Fig. 1, but illustrating the arrows pointing in the opposite direction;

Fig. 3 is a perspective view of a bearing member mounted in the door;

Fig. 4 is a fragmentary horizontal sectional view taken through one end of the casing of the indicator;

Fig. 5 is a face view of an operating disk forming part of the device;

Fig. 6 is an edge view of the disk shown on Fig. 5;

Fig. 7 is an enlarged vertical sectional view showing the mounting of the casing and operating parts on the side of the door or car body;

Fig. 8 is a perspective view of the indicator casing;

Fig. 9 is a view similar to Fig. 8 but looking toward the opposite side of the casing;

Fig. 10 is an enlarged plan view of the device partly in section at one end;

Fig. 11 is a front elevational view of the device shown on Fig. 10.

Fig. 12 is a transverse sectional view of the casing; and

Fig. 13 is a fragmentary perspective view of one end of the casing with one side removed.

Referring to the drawings in detail, 14 indicates the side of the car body which in the present instant is illustrated as a door having the usual frame 15 and glass panel or window 16 slidable in the guide face 17 with suitable means for raising and lowering the same. The inner wall is designated at 18 and is shown provided with upholstery 19 including suitable padding and an inner wall or bracket 20. Between the inner and outer walls a space or compartment is formed to receive the window pane and at the bottom upon a suitable frame member 21, is mounted a relatively inverted U-shaped bearing member 22 having bottom flanges 23 by which it may be attached by the fasteners 24 disposed through openings in the flanges. A guide pulley or sheave 25 has a bearing at 26 in the opposite sides of the member 22 and pulleys 27 are journaled at 28 at opposite sides of the pulley 25 and above these pulleys 27 the top of the bearing member 22 is provided with recesses 29 for a purpose which will presently appear.

A bearing sleeve 30 is mounted in the inner walls 18 and 20 to rotatably support a stub shaft 31 having a crank 32 by which it may be turned and the outer end of the shaft is squared to detachably take the squared opening 33 in an operating disk or pulley 34 within the space between the walls 14 and 18, the disk or pulley 34 being grooved on its periphery as shown at 35, more particularly on Figs. 5 and 6 of the drawings. This disk is detachably held on the shaft by a nut 36 and is provided with an upwardly extending radial arm 37, the free end of which is apertured at 38 for connection with the lower end of a contractile spring 39 the upper end of which is anchored to the door frame member 40 so as to hold the arm normally in upright position. The lower portion of the arm is enlarged and provided with apertures 41 to which cables 42 are connected, the cables extending down around the grooves of the disk 34 and being trained through the recess 29 and under the pulleys 25 and 27 and then up through the other recesses 29 with the other ends oppositely wound upon a spool 43.

The spool 43 is fixed upon an inner end of the shaft 44 journaled in bearing sleeves 45 and 46 through the wall 14 and a metallic plate 47 bolted through said wall as indicated at 48. These bolts are also used to secure a mounting for the indicator casing to the outer side of the wall 14. This mounting includes a plate 49 on which is disposed an upward guide member 50 so as to project outwardly therefrom, by securing against the top edge of plate 49 as indicated at 51. The bolt 48 serves to secure a lower guide member 52 to the inner face of the plate 49 near the bottom, and the lower face of the guide member 50 and top face of the guide member 52 are provided with central recesses 53 to take a ball bearing 54. The outer face of the plate 49 is received to accommodate a bevel gear 55 fixed on the outer end of the shaft 44 which meshes with teeth formed on the bottom of a rack bar 56 slidable horizontally in a groove also formed in the outer face of the plate 49 and shown as dove-tailed in cross section. The outer face of the rack bar 56 is formed near each end with a plurality of teeth 57, designed to operate the indicating casing in a manner to be subsequently explained.

The indicator casing is represented generally by the numeral 58 and is in the form of an elongated casing of rectangular section with central ends 59. It is made up of two sections 60 and 61 which are arranged to overlap and are detachably connected as by means of screws 62. At the top and bottom this casing is reenforced by plates 63 and the overlapping ends are provided with a series of openings 64 forming segments to be engaged by the teeth 57. The opposite sides of the casing have openings with transparent windows 65 with suitable colored coverings of transparent material and shaped in the form of arrows with the arrows on the opposite sides pointing in opposite directions. The top and bottom plates are formed with grooves 66 the intermediate portions of which curve to a point as indicated at 67 so as to diverge toward the opposite side of the casing from which the end portions of the grooves 66 are positioned. Pivot pins 68 are provided near each end of the casing and extend vertically with their ends projecting above and below to engage corresponding recesses 69 in the guide members 50 and 52 near the opposite ends of the latter. These recesses extend longitudinally and are spaced apart at their inner ends, and their outer ends extend at an angle to communicate with the free edges of the guide members as indicated at 70 in Fig. 10 of the drawings, so as to allow the pivot pins to pass from or enter the recesses or grooves 69 according to which end of the indicator casing is extended. Each end of the casing has a block 71 in which is rotatably mounted a roller 72 to prevent the end of the casing from jamming and to guide it outwardly when projected as well as inwardly when drawn in or retracted to an inoperative position parallel to the side wall or body of the car.

In order to illuminate the arrows of the casing a bushing 73 is detachably bolted through the walls 14 and 47 and at plate 49 as shown in Fig. 7, and the outer end of this bushing is cupped as at 74 to receive a stationary contact 75 from conductor 75' adjacent the end wall of the casing. Each end of the casing carries a contact 76 in the form of a pin projecting therefrom and mounted in an insulated housing 77 as shown more particularly in Fig. 4 of the drawings. Each movable contact pin has an enlargement 78 limiting its outward displacement by engagement with an end wall formed by the bore of the housing 77. An expansible spring 79 is mounted on the pin 76 against the shoulder or enlargement 78 and a cap 80 threaded on the housing so as to hold the pin projected to form the contact as described. The pin also serves as a terminal at its inner end for a conductor 81 held between nuts 82 and these conductors extend from opposite ends of the casing to the center for connection with electric light socket 83 mounted in insulated blocks 84 held in the casing by screws 85. Lamps 86 are received in the sockets to illuminate the arrows in the respective compartments of the indicator casing or arm into which the casing is guided by the blocks 84. The top and bottom plates of casing may be suitably riveted to the top and bottom walls of the sections 59 and 61, composing the same, although any other suitable assembling means may be employed. The return wires are indicated at 81' as distinguished from the leading wires or conductors 81 and are grounded to the frame of the machine through the casing 58 as shown on Fig. 7.

In the operation of the device, it will be apparent that with the arm 37 in an upright position, the casing or indicator arm bearing, the arrows are normally disposed within the recesses or guiding members precluded from view as indicated in Figs. 10 and 11. When it is desired to make a turn or project the indicator to warn a driver of an on-coming car or pedestrians of direction of travel or turn, the driver of the car equipped with this device simply turns the crank 32 and in so doing imparts partial rotation to the disk 34 against the action of the spring 39. One of the cables 42 is caused to unwind from the spool 43 and the other one winds thereon so as to impart rotation to the bevel gear 55. According to the direction of rotation of the gear 55, the rack 56 will be shifted longitudinally in its guided way and by the meshing of the teeth 57 with the segments produced by the openings 64, the casing will be turned on its pivot 68 at one end. If the rack moves to the right, in Fig. 10, the casing will be swung on its pivot at the left hand and shifted outwardly at its right, and with the other pivot passing out through the recesses 70 the pivots will be simultaneously shifted in the left hand groove or recess 69. Simultaneously the bearing balls 54 retained in the recesses 53 will permit the casing to travel by reason of the recesses or grooves 66 from the intermediate portion 67 in which the bars are normally positioned and when the outward ends of the recesses 66 have approached the central point occupied by the bars, the casing or arm having the arrows or pointers indicating direction of travel will be arranged to extend outwardly at right angles or perpendicular to the side of the car or door thereof, as shown in dotted lines on Fig. 10 and also as indicated in Figs. 1 and 2. In Fig. 1 the arrows are pointing to indicate travel to the left and in Fig. 2 the arrows are pointing to indicate travel to the right, assuming that the device is applied to the left hand side of the car, that is adjacent the driver's seat in cars having a left hand drive. Of course, with cars having a right hand drive the arrangement would be the opposite. It will also be apparent that as the casing is turned or shifted the movable contact 76 will be brought into position to engage the stationary contact 75, thus closing the circuit to one or the other of the lamps 86 so as to illuminate the arrows or pointers indicating traveling direction. The circuit will be broken as soon as the handle or crank 32 is released and returned to normal position by the spring 39 centralizing the arm 37 or by manually turning the crank in the opposite direction. The result of this is that the cables 42 will be oppositely moved to impart opposite rotation to the spool 43 and shaft 44 and consequently to the gear 55 whereby the rack bar 56 will be slid into the opposite direction and cause the casing to swing into its housing formed by the guide members where it is hidden from view and protected, as indicated on Figs. 10 and 11. The rollers 42 assist in the projection and retraction of the casing and prevent jamming thereof, and especially at the end which is moved out and in at the time. Obviously, when it is disclosed to indicate travel in the opposite direction, the crank 32 will be turned in the opposite direction but the operation of projecting the casing by movements of the parts will be exactly the same as heretofore described, except that the movements will be in the reverse direction.

It has been described that when the casing or indicating device has been turned or shifted so as to project outwardly and preferably in a position normal or perpendicular to the side of the car, the movable contact 76 will be brought into position to engage the stationary contact 75, thus closing the circuit to one or the other of the lamps 86 so as to illuminate the arrows or pointers indicating the direction of travel, or the direction in which the car will turn. It will be noted on Fig. 7 that the inner wires or conductor 81 extends to the outer lamp 86 and thus the device is so arranged that the outer lamp only will be placed in circuit for illumination of the outer arrows 65. This is desirable because the visibility thereof is better and because the arrangement is such that when the device is reversed in its position from that shown on Fig. 1 to that shown on Fig. 2, the arrows will point inwardly instead of outwardly to indicate the opposite direction of travel and as the outer lamp only will be lit in each position of the device, the outer arrows will be illuminated and will indicate opposite direction of traveling or turning. The circuit is a simple one-wire circuit grounded to the casing or frame of the machine. The circuit in each instance is traced from the source of energy such as a battery or the like on the car or automobile and may be connected with a usual lighting circuit. Through a conductor 75' leading to the stationary contact 75, the circuit is traced through the movable contact 76 and then through the conductor 81 to one of the lamps 86, being preferably the outer lamp as previously described. The circuit is then traced through a conductor 81' to the metallic part of the casing 58 and then through the metallic parts, gears, etc., connected thereto, to the metallic body of the automobile and substantially grounded to the frame thereof.

It will be apparent that I have provided a very simple device which can be economically produced and easily mounted on the door of the car without material alterations, and which when once installed will not be likely to get out of order. It will also be apparent that while I have described the device in the preferred form in which I desire to produce the same, various changes and modifications in the proportion and relation of the parts may be made within the scope of the invention without departing from the spirit thereof, and I reserve all rights to such modifications as fairly fall within the scope of the device as claimed.

What I claim as new is:

1. In a direction indicator, a housing adapted to be arranged on the side of the car, a casing bearing pointers arranged to lie within said housing along side of the car, means connecting said casing with the housing to permit movement both axially and pivotally of the casing with respect to the housing to project the same therefrom, and means for bodily moving said casing.

2. In a direction indicator, a housing adapted to be arranged on the side of the car, a casing bearing pointers arranged to lie within said housing along side of the car or to be projected therefrom, and means for operating said casing from within the car, said casing being mounted for both axial and pivotal movement to be projected from either end with the arrows pointing in opposite directions according to the direction of travel or turn.

3. A direction indicator for automobiles comprising guiding means arranged on the side of the car, a casing normally mounted therein parallelly of the car body, said casing having arrows thereon indicating direction of travel, means for actuating said casing to move the same bodily both pivotally and axially to project either end thereof from the guiding means according to the direction of travel or to retract the casing within the guiding means, and means for actuating said casing from within the car.

4. In a direction indicator the combination with the side wall or door of an automobile, a housing mounted thereon at the outside, a rack slidable in the housing, a gear meshing with the rack, means for actuating said gear in opposite directions from within the car, an elongated casing having arrows in its opposite sides and having segments at its ends for engagement with teeth on the rack near its opposite ends for pivoting the casing at either end and causing the other end to project outwardly from the housing, and means for guiding said casing in its movements to project the casing or to draw the same into the housing.

5. In a direction indicator the combination with the side wall or door of an automobile, a housing mounted thereon at the outside, a rack slidable in the housing, a gear meshing with the rack, means for actuating said gear in opposite directions from within the car, an elongated casing having arrows in its opposite sides and having segments at its ends for engagement with teeth on the rack near its opposite ends for pivoting the casing at either end and causing the other end to project outwardly from the housing, means normally centralizing the operating means with the casing disposed in the housing and means for illuminating the arrows of the casing.

6. In a direction indicator the combination with the side wall or door of an automobile, a housing mounted thereon at the outside, a rack slidable in the housing, a gear meshing with the rack, means for actuating said gear in opposite directions from within the car, an elongated casing having arrows in its opposite sides and having segments at its ends for engagement with teeth on the rack near its opposite ends for pivoting the casing at either end and causing the other end to project outwardly from the housing, pivots on the ends of the casing at the top and bottom, the housing having recesses receiving said pivots with portions extending through the edge of the housing to permit the pins at either end to project therefrom whereby the casing may be disposed at right angles to the housing with the arrows pointing in either direction, the casing having grooves diverging to a central point and restraining members carried by the housing and means in said grooves for guiding the casing in its movements in opposite directions to cause projection or retraction thereof from and into the housing with the pivot pins entering the recesses, and means within the car and operatively connected to the gear shaft for rotating it in opposite directions to reciprocate the rack to actuate the casing as described.

7. In a direction indicator a housing constituting a guiding means having top and bottom grooves spaced apart with portions extending through the edge thereof near each end, a casing having arrows in its opposite faces and central ends with openings forming segments, a rack bar having teeth for engaging said openings, means for shifting said rack bar in opposite directions to slide the casing in an arc to project outwardly from the housing at either end or to be retracted into the housing, and means for guiding the casing in its movements to restrain its entire displacement from the housing.

8. In a direction indicator a housing constituting a guiding means having top and bottom grooves spaced apart with portions extending through the edge thereof near each end, a casing having arrows in its opposite faces and central ends with openings forming segments, a rack bar having teeth for engaging said openings, means for shifting said rack bar in opposite directions to slide the casing in an arc to project outwardly from the housing at either end or to be retracted into the housing, means for guiding the casing in its movements to restrain its entire displacement from the housing, and frictional members at the ends of the housing for guiding the casing into and out of the same, the top and bottom of the casing having grooves diverging at the centre, balls carried in fixed position in the housing and engaging said grooves to guide the casing in its movements and restrain it from displacement, a gear meshing with the rack bar, a spool connected to the gear, a disk, cables attached to the disk and connected to the spool for winding thereon and unwinding therefrom in opposite directions, guiding means for the cables, and means for rotating the disk.

9. In a direction indicator of the class described, an indicating member arranged normally in position longitudinally of a car body and adapted to be shifted in an arc running in the general direction of the car body to project substantially perpendicular thereto and having means thereon indicating opposite directions of travel when shifted in opposite directions.

10. In a direction indicator, a housing, a casing provided with direction indicating signs carried within the housing and axially movable with respect thereto, and means for inducing pivotal movement of the casing at either end simultaneously with axial movement to project either end of the casing from a common point midway the ends of the housing.

11. In a direction indicator, a housing having an elongated chamber therein, a casing fitting in the chamber and provided with direction indicating signs and axially movable with respect to the housing, means for pivoting the casing in the housing at either end, and means for bodily moving said casing both axially and pivotally from either end to project either end of said casing from the chamber at a common point midway the ends of the housing.

In testimony whereof I affix my signature.

ANDREW ZAPART.